United States Patent Office 3,224,647
Patented Dec. 21, 1965

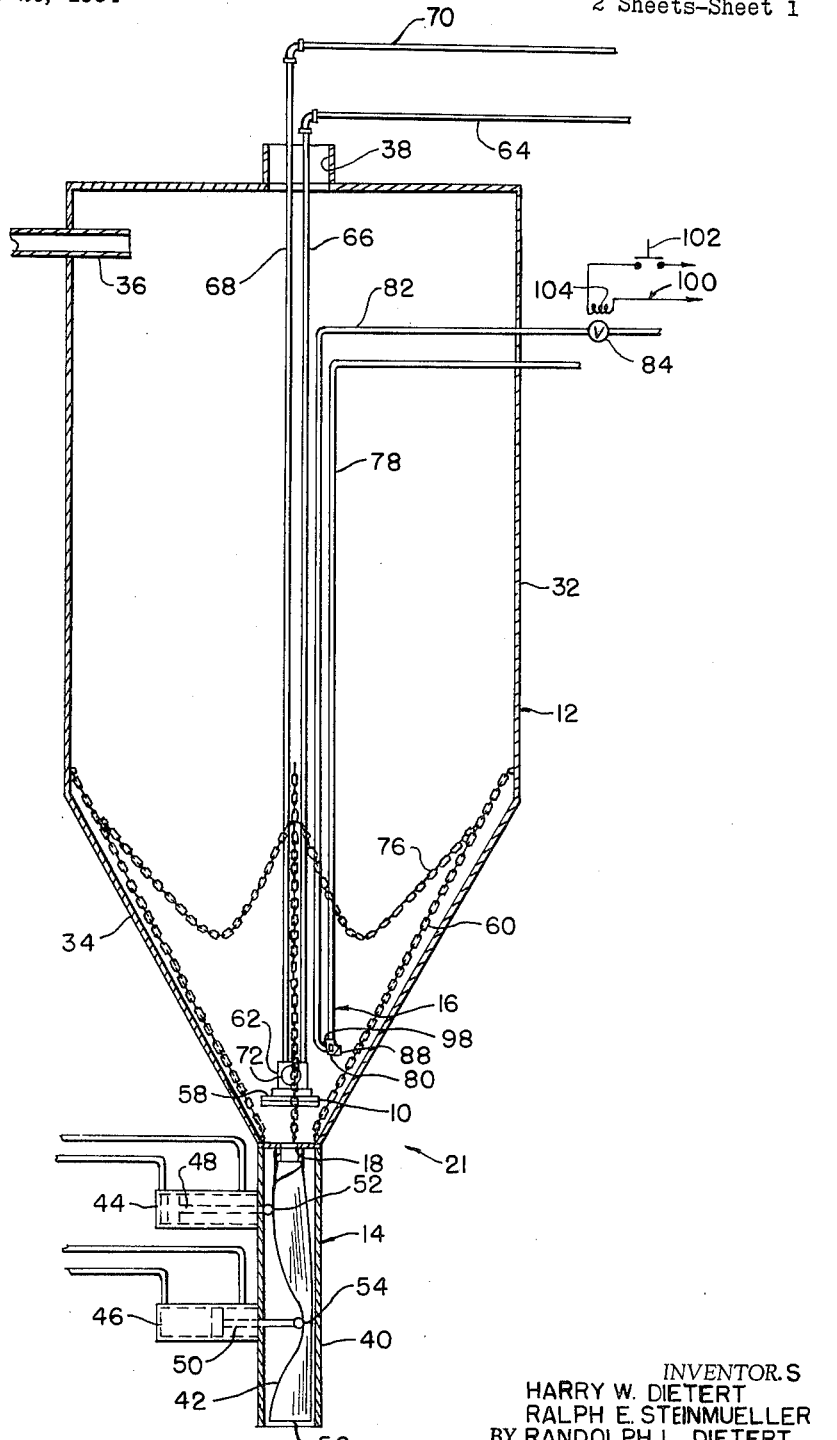

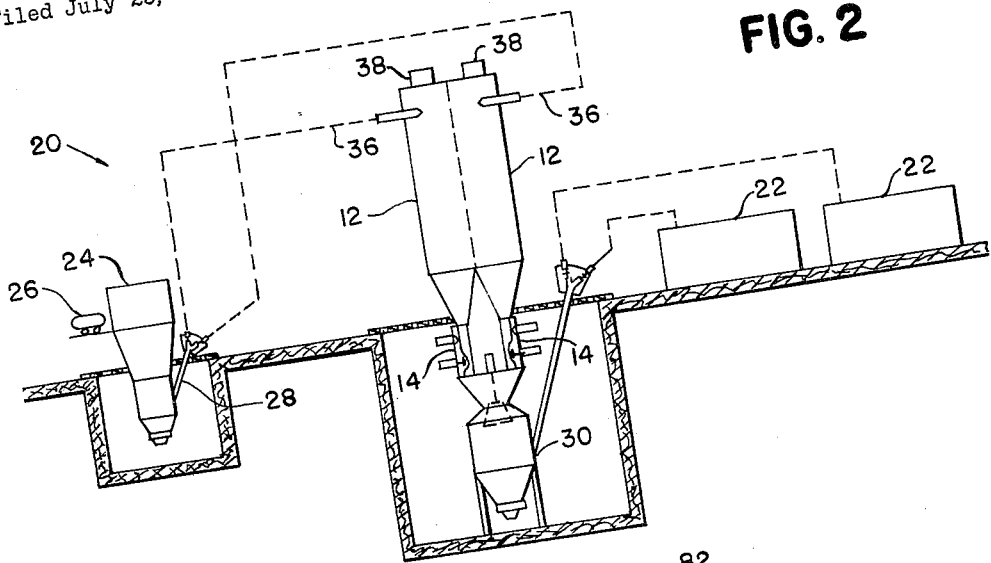
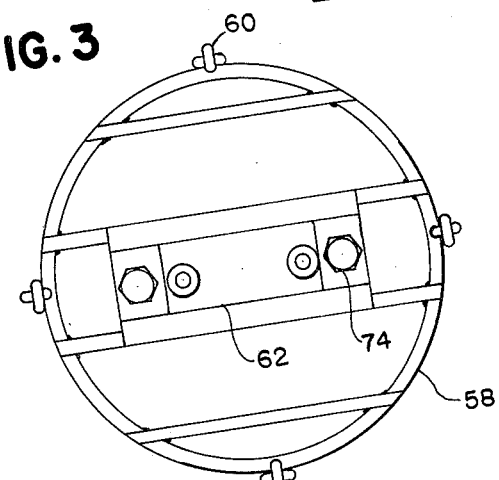
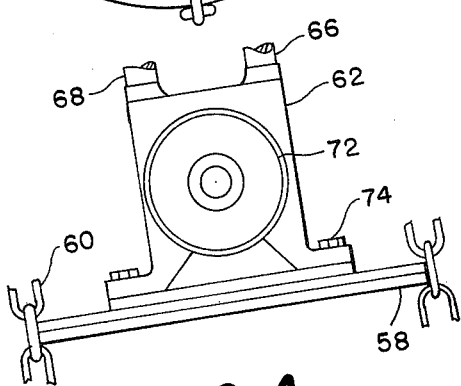
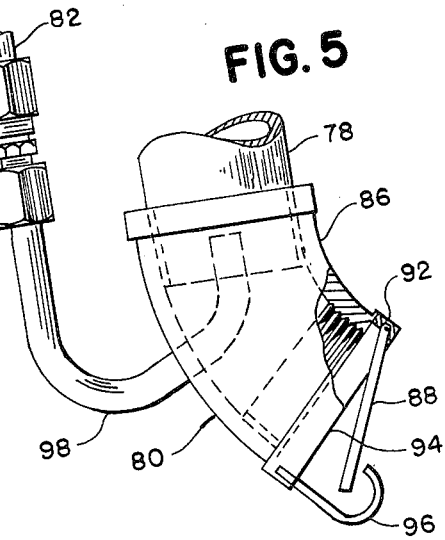

3,224,647
MATERIAL FLOW CONTROL APPARATUS
Harry W. Dietert, Kerrville, Tex., and Ralph E. Steinmueller and Randolph L. Dietert, Detroit, Mich., assignors to Harry W. Dietert Co., Detroit, Mich., a corporation of Michigan
Filed July 23, 1964, Ser. No. 384,687
8 Claims. (Cl. 222—190)

The invention relates to storage and distribution apparatus and refers more specifically to structure positioned in a storage bin and operable in conjunction with the storage bin and measuring and dispensing apparatus for improving the flow of material from the storage bin into the measuring and dispensing apparatus.

In the past storage bins have often been designed to pass flowable material, such as wood flour additive for foundry sand, from a relatively small opening in the funnel shaped bottom portion thereof. With such storage bins the material flowing therethrough has a tendency to pack in an arch over the opening whereby flow from the opening is hindered or prevented entirely. In addition the material often packs on the sides of the bin in the inwardly sloped funnel shaped bottom portion to prevent proper flow of material from the bin.

Also, with measuring and dispensing apparatus wherein air is trapped, after the apparatus has been emptied of measured material therein which air must be displaced through the material in the storage bin being fed into the measuring and dispensing apparatus on subsequent filling of the measuring and dispensing apparatus, the flow of material into the measuring and dispensing apparatus has been hindered by the air trapped in the apparatus.

It is therefore an object of the present invention to provide improved structure for storing, measuring and dispensing flowable material, such as bonding agent for foundry sand.

Another object is to provide improved structure for storing, measuring and dispensing foundry sand bonding agent, such as wood flour, including a storage bin, measuring and dispensing apparatus, an opening between the bin and apparatus and means for vibrating the bonding agent in the storage bin to prevent packing thereof as it passes through the opening between the storage bin and the measuring and dispensing apparatus.

Another object is to provide structure as set forth above wherein the storage bin has a converging funnel shaped bottom and further including a grate positioned adjacent the opening in the bottom, chains within the funnel shaped bottom of the storage bin supporting the grate and vibrating means secured to the grate.

Another object is to provide structure as set forth above and further including exhaust means positioned adjacent the opening between the storage bin and measuring and dispensing apparatus for exhausting air from the measuring and dispensing apparatus on feeding of the bonding agent into the measuring and dispensing apparatus.

Another object is to provide structure as set forth above wherein the exhaust means includes an exhaust pipe one end of which is located adjacent the opening between the storage bin and measuring and dispensing apparatus, a check valve on the one end of the exhaust pipe and an air conduit extending into the exhaust pipe adjacent the check valve end thereof for introducing air into the exhaust pipe in a direction away from the check valve to blow bonding agent out of the exhaust pipe.

Another object is to provide an improved method of transferring stored material, such as bonding agent for granular material, between a storage bin and measuring and dispensing apparatus.

Another object is to provide an improved method for transferring bonding agent, such as wood flour for granular material such as foundry sand, between a storage bin and measuring and dispensing apparatus therefor comprising vibrating the bonding agent adjacent the point of transfer of the bonding agent from the storage bin to the measuring and dispensing apparatus.

Another object is to provide an improved method for transferring bonding agent for granular material from a storage bin to measuring and dispensing apparatus including the step of exhausting air trapped in the measuring and dispensing apparatus through the storage bin during transfer of material from the bin to the apparatus.

Another object is to provide structure for and a method of controlling the flow of finely divided or powdered material which is simple, economical and efficient.

Other objects and features of the invention will become apparent as the description proceeds, especially when taken in conjunction with the accompanying drawings, illustrating a preferred embodiment of the invention wherein:

FIGURE 1 is a longitudinal section view of a storage bin and measuring and dispensing apparatus for granular material bonding agent or the like including vibrating air exhaust structure positioned therein constructed in accordance with the invention.

FIGURE 2 is a diagrammatic elevation view, partly in section, of apparatus for adding bonding agent to granular material including a pair of storage bins and measuring and dispensing apparatus constructed in accordance with the invention.

FIGURE 3 is an enlarged plan view of the grate and vibrator of the vibrating structure illustrated best in FIGURE 1.

FIGURE 4 is an elevation view of the grate and vibrator structure illustrated in FIGURE 3.

FIGURE 5 is an enlarged elevation view, partly broken away, of a portion of the exhaust structure illustrated in FIGURE 1.

With particular reference to the figures of the drawings, one embodiment of the present invention will now be considered in detail.

As illustrated best in FIGURE 1, the invention includes the vibrating structure 10 positioned in a storage bin 12 adjacent the opening 18 between the storage bin and measuring and dispensing apparatus 14. The exhaust structure 16 positioned in the storage bin 12 adjacent the opening 18 is also a part of the improved apparatus 21 for transferring material, such as bonding agent for foundry sand, between a storage bin 12 and measuring and dispensing apparatus 14.

In operation the vibrating structure 10 vibrates the material in storage bin 12 to prevent packing thereof in the storage bin 12 which would decrease the flow of material from the storage bin into the measuring and dispensing apparatus 14. Exhaust structure 16 exhausts air trapped in the measuring and dispensing apparatus 14 during a previous dispensing operation as the measuring and dispensing apparatus 14 is being filled with material flowing through opening 18 from storage bin 12.

More specifically the storage bin 12 and measuring and dispensing apparatus 14 may be a part of a larger apparatus 20 for unpackaging, storing, measuring and transporting bonding agent into mixers 22 for conditioning granular material, such as foundry sand. As shown in FIGURE 2, the apparatus 20 includes the sack opening structure 24 for automatically opening and emptying sacks of bonding agent 26, pneumatic structure 28 for transferring the bonding material which may be wood flour between the sack opening structure 24 and the storage bins 12. In the apparatus 20 the bonding agent in the storage bins 12 is transferred through the measuring and dispensing apparatus 14 to the pneumatic transfer structure 30 from which it is transported to the mixers 22 as desired.

The over-all operation of apparatus similar to apparatus 20 for feeding bonding material into granular material conditioning mixers 22 is considered in more detail in commonly owned patent application, Serial No. 259,069, filed February 18, 1963 now U.S. Patent No. 3,168,926.

The operation of the apparatus 20 and the detailed structure of the sack opening structure 24, pneumatic transfer structure 28 and 30 and mixers 22 will not be considered in detail herein since the present invention, as illustrated best in FIGURE 1, is particularly concerned with providing adequate flow of the bonding agent from the storage bin 12 into the measuring and dispensing apparatus 14.

With particular reference to FIGURE 1, the storage bin 12 includes the upper cylindrical portion 32 and the lower inwardly sloped funnel shaped portion 34 terminating in the opening 18 between the storage bin 12 and measuring and dispensing apparatus 14. Transfer conduit 36 is provided extending through the storage bin 12 adjacent the top thereof through which bonding agent, such as wood flour for foundry sand, is fed into the storage bin 12 by, for example, pneumatic transfer structure 28. Storage bin 12 is further provided with the exhaust stack 38 at the top thereof through which air used for transporting the bonding agent into the storage bin 12 may exhausted.

The measuring and dispensing apparatus 14 includes the dispensing chute 40 and the flexible liner 42 for the chute 40 secured over opening 18 in the bottom of the storage bin 12 by convenient means (not shown). The measuring and dispensing apparatus 14 further includes the piston and cylinder structures 44 and 46 including the piston rods 48 and 50, respectively, having abutment members 52 and 54 secured to the ends thereof in the chute 40.

In operation with the piston and cylinder structures 44 and 46 actuated as illustrated, the flexible liner 42 is closed by the abutment means 54 pressing the flexible liner 42 into engagement with chute 40 so that with the piston 48 in a retracted position as illustrated the bonding agent will flow from bin 12 into the portion of the flexible liner 42 between pistons 48 and 50 and will be retained therein. On subsequent reverse actuation of both piston and cylinder structures 44 and 46, the quantity of bonding agent in the flexible liner 42 between pistons 48 and 50 will be dispensed from the open end 56 of liner 42.

On subsequent reverse actuation of the piston and cylinder structures 44 and 46 to return them to the position in which they are shown in FIGURE 1, the bonding agent will flow through opening 18 in the bottom of bin 12 and into the upper portion of the flexible liner 42 to again fill the portion of the liner 42 between the pistons 48 and 50 with bonding material. During each complete cycle of operation of the piston and cylinder structures 44 and 46 it will therefore be seen that a predetermined quantity of bonding agent will be dispensed from the end 56 of the liner 42 providing the bonding agent is free to flow into the liner 42 through the opening 18.

With storage bins constructed as storage bin 12 finely divided or powdered bonding agents, such as wood flour, have a tendency to pack on the sloping sides of the funnel shaped portion 34 of the bin and to form an arch over the opening 18 so that free flow of the bonding agent into the flexible liner 42 is prevented. The vibrating structure 10 is provided in accordance with the invention to control the flow of bonding agent through the opening 18 in the bottom of the storage bin 12.

The vibrating structure 10 includes the grate 58, as best shown in FIGURE 3, supported on chains 60 which extend substantially parallel to the sloping sides of the portion 34 of the storage bin 12. The air driven vibrator 62, best shown in FIGURE 4, which is actuated by air passed through conduit 64 and flexible hose 66 to one side of the vibrator 62 and exhausted from the vibrator 62 through flexible hose 68 and exhaust pipe 70, is also part of the vibrating structure 10 and is provided to vibrate the grate 58 and attached chains 60 with a vertical component of movement.

Thus the vibrator 62 is provided with a central eccentric rotor 72 which is caused to rotate by the air fed through conduit 64 and exhausted through conduit 70. It will be understood that the rotor 72 produces both vertical and horizontal components of vibration. Vibrator 62 may be secured to grate 58 by convenient means, such as bolts 74.

The vibrating structure further includes the chains 76 connected to the chains 60 and extending substantially peripherally of the storage bin 12, as shown best in FIGURE 1. The chains 76 are primarily effective in preventing packing of the bonding agent on the sloping sides of the portion 34 of the bin 12. The grate 58 is positioned at the crown of the arch which would normally form over the opening 18 in the bottom of storage bin 12 so that the function of the grate is to break up the arch. The over-all function of the vibrating structure 10 is thus to provide a constant flow of bonding agent through the opening 18 by preventing the bonding agent from packing in the storage bin 12.

The exhust structure 16 includes the exhaust pipe 78 extending from the bottom of the storage bin 12 adjacent the opening 18 out of the storage bin 12 adjacent the top thereof. The check valve 80 and air supply conduit 82 having the solenoid actuated valve 84 therein are also part of the exhaust structure 16.

As shown in more detail in FIGURE 5, the check valve 80 comprises a pipe coupling 86 secured to the bottom of exhaust pipe 78 and having the cover 88 mounted on pivot member 92 over the end 94 thereof. The stop 96 is provided to prevent opening of the cover 88 more than a predetermined amount.

The air supply conduit 82 terminates in a U-shaped member 98 extending through coupling 86 and opening into the exhaust pipe 78 in a direction away from the cover 88 of check valve 80 as best shown in FIGURE 5.

In operation of the exhaust structure 16, during the cycle of operation of the measuring and dispensing apparatus 14 air is fed through conduit 82 on completing of circuit 100 connected to a suitable source of electrical energy (not shown) by closing push-button 102 to energize solenoid 104 and open solenoid actuated valve 84. Air under considerable pressure is thus directed upwardly through exhaust pipe 78 and will fluidize the bonding agent in the exhaust pipe 78 and thus blow the bonding agent out of the exhaust pipe 78. The air in the exhaust pipe 78 proceeding away from the cover 88 of the check valve 80 causes the check valve 80 to close whereby the check valve 80 and exhaust pipe 78 may be completely cleared of bonding agent.

Subsequently the solenoid 104 is deenergized to close valve 84 so that no air is blown through exhaust pipe 78. The cover 88 opens due to gravity at this time so that air trapped in the flexible liner 42 of the measuring and dispensing apparatus 14 can pass upwardly through the opening 18, grate 52 and out through the check valve 80 and exhaust pipe 78.

In a complete cycle of operation of the material transfer apparatus 21 the vibrator 62 is continually actuated through air supplied from conduit 64 and exhausted through conduit 70 to vibrate the grate 58 and chains 60 and 76, thus causing flow of bonding agent from the bin 12 through the opening 18 into the portion of the flexible liner above piston 50 with the piston and cylinder structures 44 and 46 in the position shown in FIGURE 1. During this time the check valve 80 having previously been blown out is open so that the air trapped in the flexible liner 42 above piston 50 is exhausted through exhaust pipe 78 and does not hinder the filling of the liner 42.

The piston and cylinder structures 44 and 46 are subsequently actuated to dispense a predetermined quantity of bonding agent from end 56 of liner 42 with the abutment 52 closing the liner 42 above piston 48. At this time the valve 84 in exhaust structure 16 may be actuated to blow out the exhaust pipe 16 if so desired. The piston and cylinder structures 44 and 46 are then reversed to complete a cycle of operation of the material transfer apparatus 21.

If desired the exhaust structure 16 may be actuated after filling the storage bin 12 by pneumatic means through conduit 36 to exhaust any bonding agent which might tend to clog the exhaust conduit 78 and check valve 80.

While one embodiment of the present invention has been considered in detail, it will be understood that other embodiments and modifications thereof are contemplated. It is the intention to include all such embodiments and modifications as are defined by the appended claims within the scope of the invention.

What we claim as our invention is:

1. In storage and distribution apparatus for a bonding agent for foundry sand or the like, measuring and dispensing apparatus connected over an opening in a storage bin for the bonding agent which measuring and dispensing apparatus on operation traps air in a portion thereof into which it is desired to feed bonding agent by gravity, means positioned adjacent the opening in the storage bin for exhausting the air from the measuring and dispensing apparatus to prevent the air trapped in the measuring and dispensing apparatus from preventing flow of bonding agent thereinto including an exhaust pipe extending through the storage bin and terminating adjacent the opening therein and a check valve on the end of the exhaust pipe.

2. Structure as set forth in claim 1 and further including an air conduit terminating in the exhaust pipe for blowing air through the exhaust pipe away from the check valve to close the check valve and exhaust the exhaust pipe.

3. In storage and distribution apparatus for a bonding agent for foundry sand or the like, measuring and dispensing apparatus connected over an opening in a storage bin for the bonding agent which measuring and dispensing apparatus on operation traps air in a portion thereof into which it is desired to feed bonding agent by gravity, means positioned adjacent the opening in the storage bin for exhausting the air from the measuring and dispensing apparatus to prevent the air trapped in the measuring and dispensing apparatus from preventing flow of bonding agent thereinto including an exhaust pipe extending through the storage bin and terminating adjacent the opening therein and an air conduit terminating in the exhaust pipe for blowing air through the exhaust pipe to exhaust the exhaust pipe.

4. Material transfer apparatus for controlling flow of a bonding agent for foundry sand or the like between a storage bin having an opening therein through which the bonding agent is fed and which storage bin includes a funnel shaped portion having side walls sloping toward the opening at the bottom thereof and measuring and dispensing apparatus connected to the storage bin over the opening therein comprising means for vibrating the bonding agent in the tapered portion of the storage bin and at the opening to prevent packing thereof and consequent reduction of flow through the opening and means positioned adjacent the opening in the storage bin for exhausting air from the measuring and dispensing apparatus to prevent air trapped in the measuring and dispensing apparatus from preventing flow of bonding agent thereinto including an exhaust pipe terminating adjacent the opening in the storage bin, a check valve over the terminal end of the exhaust pipe and means for blowing air through the exhaust pipe in a direction away from the check valve to close the check valve and exhaust the exhaust pipe.

5. Material transfer apparatus for controlling flow of a bonding agent for foundry sand or the like between a storage bin having an opening therein through which the bonding agent is fed and which storage bin includes a funnel shaped portion having side walls sloping toward the opening at the bottom thereof and measuring and dispensing apparatus connected to the storage bin over the opening therein comprising means for vibrating the bonding agent in the tapered portion of the storage bin and at the opening to prevent packing thereof and consequent reduction of flow through the opening and means positioned adjacent the opening in the storage bin for exhausting air from the measuring and dispensing apparatus to prevent air trapped in the measuring and dispensing apparatus from preventing flow of bonding agent thereinto including an exhaust pipe terminating adjacent the opening in the storage bin and a check valve over the terminal end of the exhaust pipe.

6. Structure as set forth in claim 5 wherein the means for vibrating the bonding agent comprises a grate positioned over the opening in the storage bin and vibrating means secured to the grate.

7. Structure as set forth in claim 6 wherein the means for vibrating the bonding agent further includes a plurality of chains extending longitudinally of the storage bin along the tapered surface to which the grate is connected.

8. Structure as set forth in claim 7 wherein the means for vibrating the bonding agent further includes chains extending circumferentially of the storage bin between the longitudinally extending chains and connected thereto.

References Cited by the Examiner

UNITED STATES PATENTS

| | | | |
|---|---|---|---|
| 2,644,617 | 7/1953 | Stirn et al. | 222—193 |
| 2,670,101 | 2/1954 | Heisterkamp et al. | 222—194 X |
| 2,934,632 | 4/1960 | Todd | 222—193 X |
| 2,935,233 | 5/1960 | Vogt | 222—189 |
| 3,079,050 | 2/1963 | Wahl | 222—334 |
| 3,104,782 | 9/1963 | Von Funk | 222—189 |
| 3,158,294 | 11/1964 | Handlee | 222—228 X |

RAPHAEL M. LUPO, *Primary Examiner.*

STANLEY H. TOLLBERG, *Examiner.*